(12) United States Patent
Newman, Jr.

(10) Patent No.: US 7,719,220 B2
(45) Date of Patent: May 18, 2010

(54) SAFETY ENHANCED CONTROL SYSTEM FOR SERVO ACTUATORS

(76) Inventor: Robert Charles Newman, Jr., 2955 Main Rd. East, Emmaus, PA (US) 18049

( * ) Notice: Subject to any disclaimer, the term of this patent is extended or adjusted under 35 U.S.C. 154(b) by 282 days.

(21) Appl. No.: 11/903,235

(22) Filed: Sep. 21, 2007

(65) Prior Publication Data

US 2009/0079378 A1 Mar. 26, 2009

(51) Int. Cl.
*H02P 1/04* (2006.01)
(52) U.S. Cl. .................................. 318/483; 318/466
(58) Field of Classification Search .................. 318/483, 318/486, 466, 468, 600
See application file for complete search history.

(56) References Cited

U.S. PATENT DOCUMENTS 4,240,516 A * 12/1980 Henderson et al. .......... 180/289
4,698,560 A * 10/1987 Andrei-Alexandru et al. . 318/54
5,334,876 A * 8/1994 Washeleski et al. ........ 307/10.1
5,760,558 A * 6/1998 Popat .......................... 318/480

OTHER PUBLICATIONS

Gross, R., Pitch Control Module [online]. Rocketboy Aircraft Products Inc., 2002, 2003 [retrieved on Aug. 16, 2008]. Retrieved from the Internet: <URL: www.fl-rocketboy.com/pcm.htm>.
VP-200 SEries Product Information. [online]. Vertical Power Inc., 2007 (last updated) [retrieved on Aug. 16, 2008]. Retrieved from the Internet<www.verticalpower.com/VP200.html>.

* cited by examiner

*Primary Examiner*—Rina I Duda

(57) ABSTRACT

An electrical control system comprising a controllably conductive device, an input receiving circuit and a timer circuit. The controllably conductive device selectively applies power to an electrically operated servo. The input receiving circuit receives an input signal from an input switch for selection of the motion of the control surface operated by the electrically operated servo. The input signal receiving circuit is coupled to the controllably conductive device to cause it to be conductive in response to the input signal. The timer circuit is responsive to a signal from the input receiving circuit for causing the controllably conductive device to be non-conductive if the input signal is present for greater than a selectable time period.

18 Claims, 6 Drawing Sheets

SAFETY ENHANCED CONTROL SYSTEM FOR SERVO ACTUATORS

BACKGROUND OF THE INVENTION

In the field of electric actuators for the control surfaces of vehicles such as aircraft and boats, there is a common method of controlling certain surfaces that incorporates an electric servo actuator and a combination of switches and/or relays to apply electrical power to the servo. These systems allow an operator to cause the servo to drive in either of two directions, for example up and down, or left and right, thereby allowing a control surface of the vehicle to be actuated in a particular manner or direction. Often these systems use a combination of single or multi-pole momentary switches of the single or double throw type to provide an input into the control system. For example, an electric elevator trim actuator, a pair of single pole-double through momentary switches may be used to actuate an up and a down trim motion of the trim servo. When these switches are actuated the trim servo is driven in a particular direction. The duration of the application of power to the servo controls the amount of trim adjustment made. Therefore, the amount of trim adjustment is controlled by the amount of time the switch is held closed. Additionally, the switches may be used to actuate other intermediate electrically controllable devices such as relays or semi-conductor switches such as transistors which in turn provide electrical power to the servo actuators.

This system of switches, electrically controllable devices and servos are typically connected in a very simple system as described to provide the actuation of a control surface. However, this system has a significant drawback from the possible failure modes that exist with devices such as switches, relays and transistors. If one of these components fails in an electrically shorted state, due to either electrical or mechanical reasons, the electrically actuated servo may receive continuous electrical power. This in turn will drive the servo to the end of its mechanical travel which in turn may drive a moveable control surface to an extreme position. An un-commanded movement of a control surface can have a significant negative effect on the performance of a vehicle. This simple system may also suffer from an undesired movement of a control surface if an operator accidentally activates one of the mentioned input switches. In the case of a general aviation aircraft these switches are located on the main control yoke or stick and are subject to inadvertent activation by an operator.

Prior art solutions to this problem have been rudimentary and include providing an additional power switch to manually disconnect power from the control system. This system required the operator to stop a run-away condition as described by disconnecting power from the malfunctioning system. Additionally, another known system includes a switch to reverse the activity of the electrically actuated servo. Both of these configurations rely on the operator's ability to detect, troubleshoot and correct the ensuing problem very quickly. Many known electrically actuated servos can move from one extreme position to the other in about 10-15 seconds. This short period of time allows for a very limited reaction time for an operator to resolve a run-away condition. Another means to mitigate this problem in prior-art systems is to include a speed control function in the driver of the electrical servo. The speed controller is used to slow down the movement of the servo thereby giving the operator more time to detect the occurrence of a run-away control system.

It is therefore highly desirable to provide a control system that limits the travel of an electrically activated servo and does not require a human operator to rapidly detect a failure mode or run-away condition. Additionally, it is desirable to provide an electrical control system that may operate an electrical servo based system at a selectable speed that further can reduce the effects of a failure condition. The system beneficially mitigates the effects of an un-commanded operation that would normally drive a moveable control surface to the full extent of its travel. Additionally, it is desirable to have a control system that can detect and terminate a run-away condition of the control system and provide an operator a means to reverse an un-commanded activity which has already taken place. A need also exists for a control system that can terminate a run-away condition regardless of which component or components in a system fail. Preferably the system would terminate a run-away commanded by multiple simultaneous failures of components.

SUMMARY OF THE INVENTION

According to one aspect of the invention, a system is provided that limits the travel of an electrically controlled actuator by including a timer circuit to control the duration of power delivered to the actuator.

According to another aspect of the invention, a system is provided that prevents an inadvertent actuation of an input switch from causing a controlled actuator to travel to the extents of its limits. Additionally, the system may include a reversing feature to allow the system to be restored to a neutral position in the case of a component failure.

Another object of the claimed invention is to provide an electronic control system for an electrically activated servo such as those used with elevator or aileron trim actuators to prevent a run-away condition from occurring in the event of a stuck or failed input switch.

Another object of the invention is to provide a combined control system that includes a speed control function as well as a time limited motion function so as to provide safer operation of an electrically controlled servo actuated control surface.

An additional aspect of the invention is to provide a control system having a time limited normal operation wherein the control inputs cause a control surface to move in a normal direction and wherein during a reverse mode of operation the same respective control inputs have the opposite time limited effect on the control surface.

The above and other objects of the present invention are furthermore achieved by an electrical control system for the operation of a moveable control surface coupled to an electrically operated servo comprising a controllably conductive device for selectively applying power to an electrically operated servo and an input signal receiving circuit for receiving an input signal from an input switch for selecting the motion of the moveable control surface operated by the electric servo and the input signal receiving circuit coupled to the controllably conductive device to cause it to be conductive in response to the input signal; and a timer circuit responsive to a signal from the input signal receiving circuit for causing the controllably conductive device to be non-conductive if the input signal is present for greater than a selectable time period.

The objects of the invention are also achieved by a control system for operating an electrically activated actuator from a source of power comprising a controllably conductive device for selective applying power to a direction control circuit wherein the controllably conductive device has a control terminal, and at least two main terminals and a direction control circuit in series connection with one of the main terminals of the controllably conductive device for controlling power delivered to the electrically activated actuator and a reset-able timer circuit having a selectable time period and having an input for receiving signals to initiate the counting of the selectable time period and an output for providing signals that correspond to the duration of the time period, wherein the reset-able timer output is coupled to the control terminal of the controllably conductive device, thereby allowing the controllably conductive device to be conductive for the selectable period of time.

BRIEF DESCRIPTION OF THE DRAWINGS

Other objects and features of the invention will become apparent after considering several illustrative embodiments taken in conjunction with accompanying drawings, in which.

DETAILED DESCRIPTION OF THE INVENTION

As shown in the accompanying numbered figures where like numbered items are depicted in various views, the following details provide by way of example several embodiments of the claimed invention.

Figure 1:
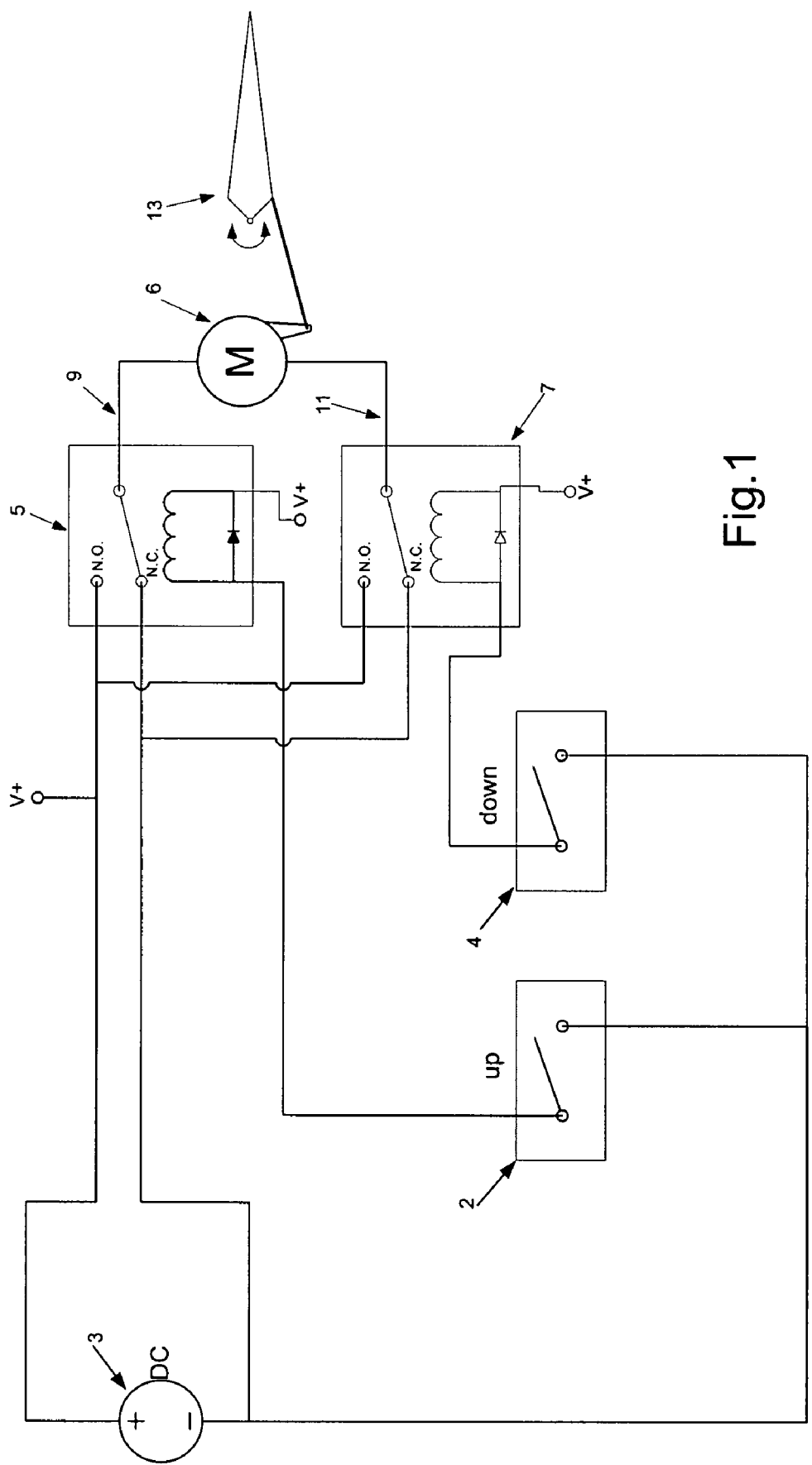
FIG. 1. is a schematic of a prior art servo actuator circuit.

In the prior art, as shown in FIG. 1, an electric control system was used to control an electrically activated servo which may be mechanically coupled to a moveable control surface. The system of FIG. 1 is an example used to control an elevator trim tab 13 on a general aviation aircraft. The control input switches 2 and 4 provide a means for a momentary input closure signal from an operator to cause the attached electric servo 6 to be actuated to move a trim tab 13. When one of the respective switches is held closed the trim tab moves between a full up and a full down deflection position. The system receives electrical power from a typical DC power bus 3. The DC voltage available from power bus 3 is provided to control relays 5 and 7. Upon closure of input switches 2 and 4, respective control relays 5 and 7 are activated. This activation allows the voltage from power bus 3 to be provided to electric servo 6.

When input switch 2 is closed the coil of relay 5 is energized causing the contacts to move from the N.C. position to the N.O. position as shown in FIG. 1. This in turn allows the power bus 3 to be connected to electric servo 6 with a positive polarity on terminal 9 and a negative polarity on terminal 11. This causes the servo 6 to drive the trim tab 13 towards the up position.

When input switch 4 is closed the coil of relay 7 is energized causing the contacts to move from the N.C. position to the N.O. position. This in turn allows the power bus 3 to be connected to electric servo 6 with a positive polarity on terminal 11 and a negative polarity on terminal 9. This causes the servo 6 to drive the trim tab 13 towards the down position.

As long as one of the input switches is closed, power from the power bus is applied to the electric servo and the servo will thereby cause any attached control surface to move. This system, although simple, is prone to failures which can lead to a run-away condition of the control surface attached to the servo. A failure of the input switches or the relays can lead to an un-commanded movement of the electric servo and the coupled control surface. Additionally, in the case of one of the described failures, the operator has no means for driving the system back to a neutral position. If this occurs in a general aviation aircraft the pilot must continue flying the aircraft until a safe landing is possible. During this condition the aircraft may require very awkward control inputs to maintain the stability of the aircraft. The control system of the invention resolves these problems as described in detail below.

Figure 2:
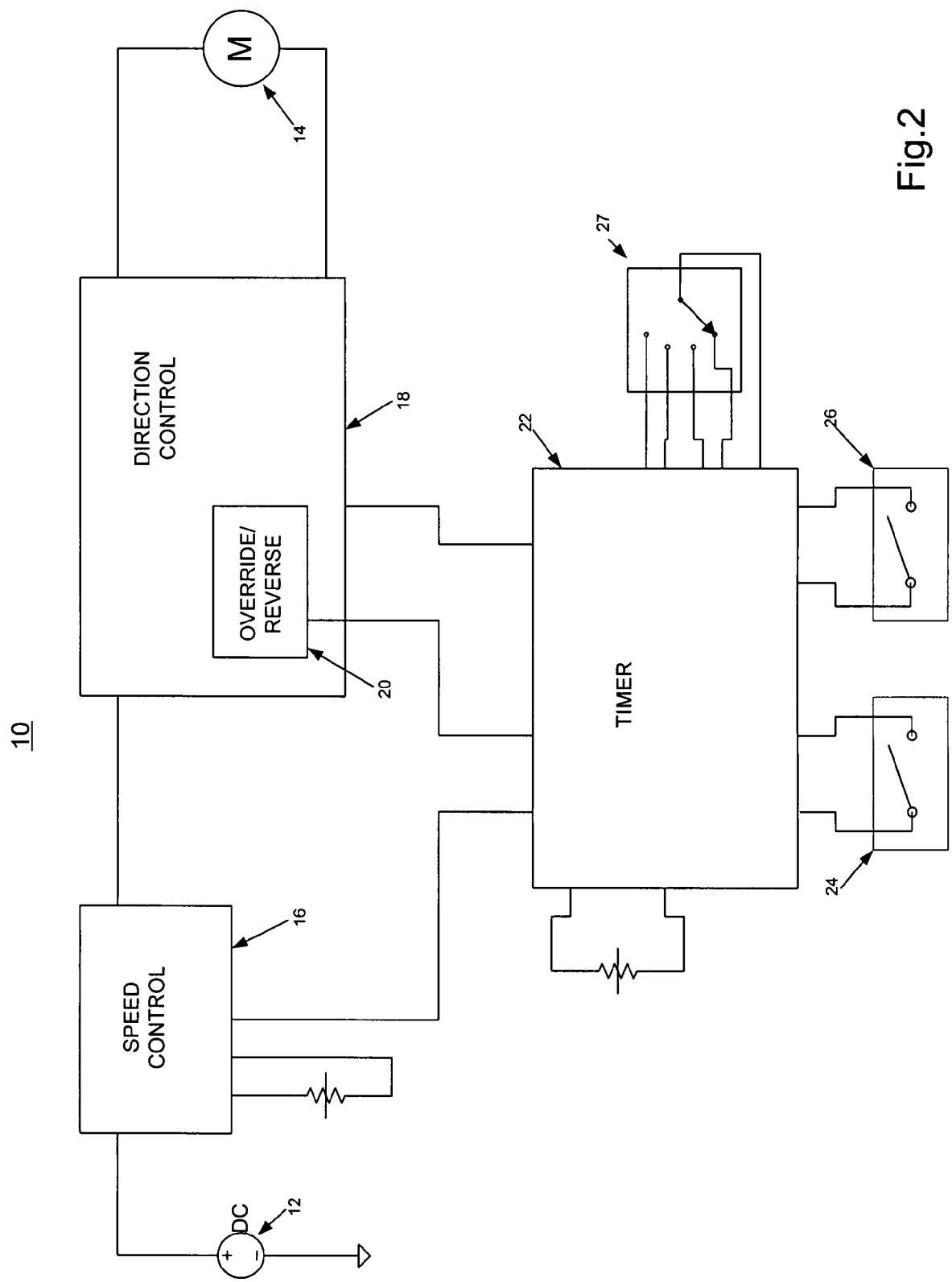
FIG. 2. is a block diagram of modules that are combined to form the system of the invention.

The block diagram shown in FIG. 2 is an electrical control system for the operation of an exemplary electrically operated servo actuator built according to the present invention. The control system 10 receives electrical power from the system power bus 12 and delivers controlled electrical power to servo actuator 14. As shown, electrical power from power bus 12 is received by speed control module 16. This module may be optionally used to provide an alternate operating speed of the servo actuator 14. The speed control module 16 includes a speed control circuit for adjusting the electrical power delivered to the servo actuator 14. If it is desired to operate the servo actuator only at its designed speed which corresponds to that which occurs with the application of the power bus 12 voltage, then speed control module 16 may be omitted. For example, if the electrically activated servo was rated to operate at twelve volts DC and it was found that with the application of twelve volts the servo moved at an acceptable speed, then a speed control module may be omitted when the associated power bus has a nominal voltage of twelve volts.

Continuing from left to right in FIG. 2, electric power from the optional speed control module 16 is delivered to the direction control module 18 and the override/reverse module 20. The direction control module 18 delivers electrical power to the attached servo 14 so as to cause the servo to actuate in a particular direction. In an implementation of a servo controller utilizing a DC motor based servo, the direction control module may be used to select the polarity of voltage delivered to the servo actuator 14. The direction control module 18 may contain relays or semi-conductor devices to accomplish the appropriate motion control. As used in this disclosure an electrical device that has at least one control terminal and two or more output terminals is considered to be a controllably conductive device. Controllably conductive devices may include but are not limited to: MOSFETs, Bi-Polar Junction Transistors, Relays, Three terminal regulators, Switching regulators, and IGBTs. Direction control module 18 includes a direction control circuit which may contain a combination of components configured appropriately for the connected electrically operated servo 14. For example, a full bridge configuration of four transistors may be used to drive a standard brushed DC motor, whereas a six transistor bridge configuration may be required for a brushless DC motor. An example intended for a standard brushed DC servo motor will be explained in further detail to follow. Additionally, direction control module 18 may include a sub-module shown as override/reverse module 20. This sub-module may be considered to be a separate element from direction control module 18 or may be integrated into the design of direction control module 18. The override/reverse module 20 provides for a means to reverse the normal direction of operation of the electrical servo 14. In the event of a stuck input switch or output relay that causes a failure mode that drives the electrical servo 14 in a particular direction, the override/reverse module 20 will allow the operator to cause the system to return to a desired position. Override/reverse module 20 may comprise controllably conductive devices such as relays or semi-conductor devices or a combination of components.

Figure 3:
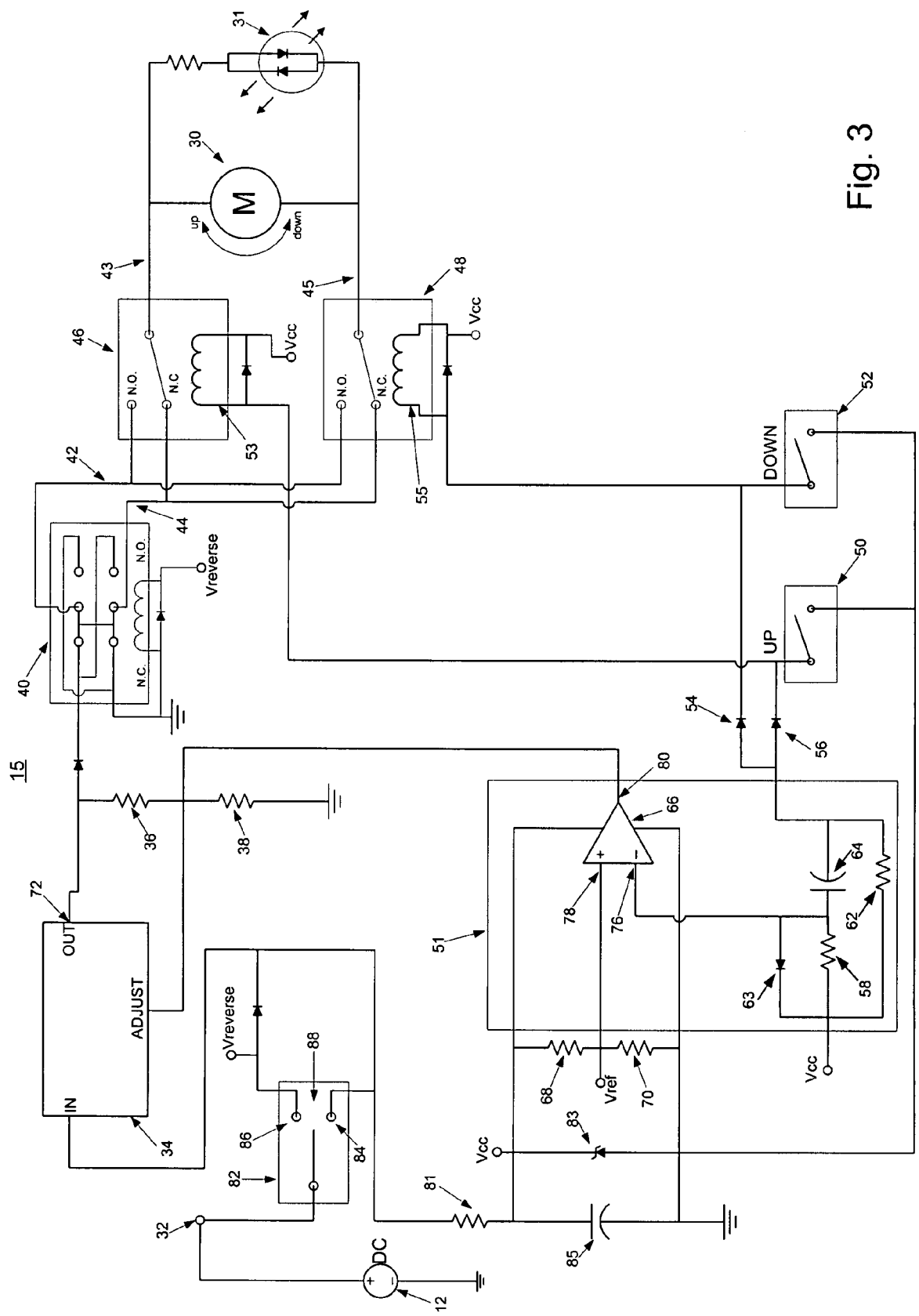
FIG. 3. is a circuit schematic of the system of the invention utilizing electric relays, a timer circuit, and a linear three terminal regulator.

Timer module 22 comprises an input signal receiving circuit and a timer circuit 51 (as shown in FIG. 3). Timer module 22 provides a time limit for which controlled power is applied to the electrical servo 14. Timer module 22 receives input signals from input switches 24, 26 and provides time limited output signals to the speed control module 16, direction control module 18 and override/reverse module 20. Timer module 22 effectively allows the system to provide activation of the electrical servo for a limited period of time. For example, the timer module 22 may be preset to allow a maximum continuous operation time of about two seconds. Upon a closure of switch 24 or switch 26, a signal may be provided to the connected modules to ensure that the electrical servo 14 is energized for a maximum of about two seconds regardless of whether the initiating switch closure remains closed beyond two seconds. The particular time duration is preferably preselectable so as to allow for the best match between delivering a sufficient duration of control input to the system 10 under normal conditions and providing an optimized degree of safety during an un-commanded operation. Under normal conditions when a switch 24, 26 is released, (allowed to return to the open circuit condition) the timer is reset and therefore ready to deliver another operating period of up to about two seconds. Thus an operator may reactivate the servo 14 for another preselected period of time by releasing input switch 24 or input switch 26 and thereafter closing the respective input switch. Alternately, the input receiving circuit may receive signals from an automated system such as an autopilot system or a flight management system. Signals from these type of systems may be wired electrically in parallel with input switches 24,26 or may have their own dedicated lines into the input receiving circuit.

Additionally, timer module 22 may receive signals from selector switch 27 to control the operation of the system 10. Particularly, selector switch 27 may be used to select a normal mode of operation as well as a reverse mode of operation.

FIG. 3 shows a detailed schematic of a servo controller system 15 constructed according to the present invention. This example provides control of a dc motor based electrical servo 30 rated nominally for operation at twelve volts. The system 15 is powered from a source of electrical power such as from the nominal twelve volt power bus 12 found in a general aviation aircraft or other vehicle.

Input power is received on input power connection 32 and is passed to selector switch 82. With selector switch 82 in either of the On position 84 or the Reverse position 86, power is applied to the input of the speed control module implemented as a three terminal voltage regulator 34. Voltage adjustment of regulator 34 is made by the resistor divider formed by resistor 36 and resistor 38. The adjusted output voltage of regulator 34 is available on the output terminal 72 of the regulator 34. The adjusted output voltage is then passed to relay 40 which serves as a portion of the override/reverse module of this example. Through the double pole double throw terminals of relay 40 the polarity of the adjusted output voltage is selectable to have a positive or negative value. This selectable voltage is made available between intermediate terminals 42 and 44. The selectable voltage is then applied to the pair of output drive relays 46 and 48. These relays ultimately provide the selectable voltage to output terminals 43 and 45 which are connected to the electrically driven servo 30.

Input switches 50 and 52 of this example of the invention may be used to cause the electrically driven servo 30 to operate a control surface in either of the up or down direction as indicated in FIG. 3. Such systems may be used to control an electric trim system such as an elevator or aileron trim tab on a general aviation aircraft. When used in an aviation system the elevator and/or aileron trim input switches may be incorporated into the control yoke or control stick of the aircraft. Additionally, the switches may be a combination of momentary switches or may be a single integrated switch such as a single pole double throw switch. Input switch 50 may be associated with the "up" motion of control surface and input switch 52 may be associated with the "down" motion. Notably, the input switches 50,52 are connected to their respective output drive relays 46,48 as well as to a timer circuit 51 to be explained in further detail below. When input switch 50 is activated and conductive, the input receiving circuit comprised of relay coil terminal 53 receives a signal to allow power to be provided to output drive relay 46 causing it move from the normally closed N.C. to the normally open N.O. position. In this condition, output drive relay 48 is not activated and remains in its normally closed N.C. position. Through this action, the voltage on intermediate terminal 42 is applied to output terminal 43 and the voltage on intermediate terminal 44 is applied to output terminal 45. The electrically driven servo 30 is driven by the controlled voltage available between terminals 43 and 45. This in turn causes the electric servo to move the attached control surface in the "up" direction. Alternately, if input switch 52 is activated and conductive, the input receiving circuit comprised of relay coil terminal 55 receives a signal to allow power to be provided to output drive relay 48 causing it to move from the normally closed to the normally open position. In this condition output relay 46 is not activated and remains in the normally closed position. Through this action the voltage on intermediate terminal 42 is applied to output terminal 45 and the voltage on intermediate terminal 44 is applied to output terminal 43. This in turn causes the electric servo 30 to move the attached control surface in the "down" direction.

Through the closure of input switch 50 or input switch 52 the respective output drive relay 46,48 is energized and the electric servo motor is driven in a particular direction. Additionally, the input receiving circuit further comprises diode 54 and diode 56 and forms a "wired-OR" function allowing either input switch 50 or input switch 52 to activate the timer module of the invention. The timer module comprises a timer circuit that may function in the following manner. The closure of input switch 50 or input switch 52 causes capacitor 64 to begin charging through resistor 58, effectively causing the timer to begin counting. Resistor 58 is connected to a regulated supply of power identified as Vcc. This power supply is derived through input resistor 81, zener diode 83 and power supply capacitor 85. This action of charging capacitor 64 causes the voltage at the inverting input terminal 76 of comparator 66 to drop to about 0.6 volts followed by a rising voltage due to the charging of capacitor 64. With a reference voltage noted as Vref on the non-inverting input terminal 78 of about 7 volts, as determined by resistor 68 and resistor 70, the output 80 of comparator 66 will go to a high state when an input switch 50,52 is closed. Output 80 of comparator 66 may be considered the output signal of this example of a timer circuit. This in turn causes the three terminal regulator 34 to begin providing regulated output voltage on its output terminal 72. For the time period between the closure of an input switch 50 or 52 until the capacitor 64 reaches the reference voltage Vref on the positive input terminal 78, the output 80 of comparator 66 will remain in a high state thereby enabling the three terminal regulator 34 to continue providing a regulated output voltage. When capacitor 64 charges to the voltage on the positive input terminal 78, the output 80 of the comparator 66 will go to a low state and drive the three terminal regulator to an off state, thereby removing power from the output terminal 72.

Through this process a timer function is enabled that provides for a selected period of time over which power is available to drive the connected electrical servo 30. The amount of time is selectable by adjusting the values of resistor 68 or 70 so as to adjust the value of the reference voltage (Vref), or by adjusting the time constant associated with the values of capacitor 64 and resistor 58. Increasing the reference voltage (Vref) will increase the time period for which the three terminal regulator 34 will be enabled. Additionally, resistor 68 or resistor 70 may be implemented as a potentiometer to facilitate a user adjustment of the selectable time period. A time period of about two seconds is sufficient for the normal operation of an elevator trim tab on a general aviation aircraft and may be achieved, for example, with the following component values as shown in Table 1.

TABLE 1

|  | Value |
| --- | --- |
| Resisitors |  |
| 81 | 470 ohms |
| 68 | 30k ohms |
| 70 | 68k ohms |
| 58 | 1 Meg ohms |
| 62 | 1k ohms |
| Capacitors |  |
| 85 | 100 uF |
| 64 | 2.2 uF |
| Diodes |  |
| 83 | 10 volt zener |
| 60 | 1N4004 |
| 54 | 1N4004 |
| 56 | 1N4004 |
| Comparator |  |
| 66 | LM393 |

When both input switches 50,52 are in their open state capacitor 64 is discharged through resistor 62 and diode 63. Notably it is preferred to select a time constant for the capacitor 64 and resistor 62 combination to be substantially shorter than that of the charging time constant of resistor 58 and capacitor 64. In this example the charge time constant is about 2.2 seconds and the discharge time constant is about 2.2 milliseconds. If either of the switches 50, 52 should fail in a manner that causes them to remain conductive or if output drive relay 46 or output drive relay 48 fails so as to remain conductive, then the timer function of the described circuit will remove power from connected electric servo 30 and prevent a full deflection run-away condition of the attached control surface.

Additionally, the system 15 of the invention may contain an override/reversing module implemented by example with override relay 40 and selector switch 82. Selector switch 82 may include positions ON, OFF and Reverse as indicated by numbers 84, 88 and 86 respectively. Additionally, in the preferred embodiment, the ON position 84 is a maintained closure of the switch 82 and the Reverse position 86 is a momentary closure. When the switch is in the Off position 88, no power is available to close the output drive relays 46, 48, and the timer circuit is discharged and power is removed from the three terminal regulator 34, thereby ensuring no power is available to drive the electric servo 30. When the selector switch 82 is in the ON position 84, all the functions of the system are enabled as previously described. When the Reverse position 86 is selected the override/reverse relay 40 is energized thereby reversing the normal polarity of voltage provided by output drive relays 46, 48. This will allow the functionality of input switches 50, 52 to have the reverse effect on electric servo 30. This allows the operator to recover to a neutral stable position in the event of a system failure such as a stuck input switch, a welded relay contact or a shorted semi-conductor device. With the implementation as shown it is also advantageous in that the movement of the selector switch is from the ON position 84 through the Off position 88 and to the Reverse position 86. This allows the timer functionality to be reset, thereby providing the normal time allotment (for example about two to three seconds) of drive voltage to the electric servo 30 if the selector switch is quickly moved from the ON position 84 to the Reverse position 86.

An optional indicator may be added to a system of the invention to provide information to the operator regarding the power being applied to the connected electric servo 30. Indicator 31 is a bi-directional configuration of LEDs that are illuminated when power is available to the electric servo 30. Indicator 31 confirms for the operator that power is available to the connected servo 30 and that it should be moving as commanded. When the selectable time period of the timer module has elapsed the indicator 31 will provide information to the operator that the servo 30 should no longer be energized.

Figure 4:
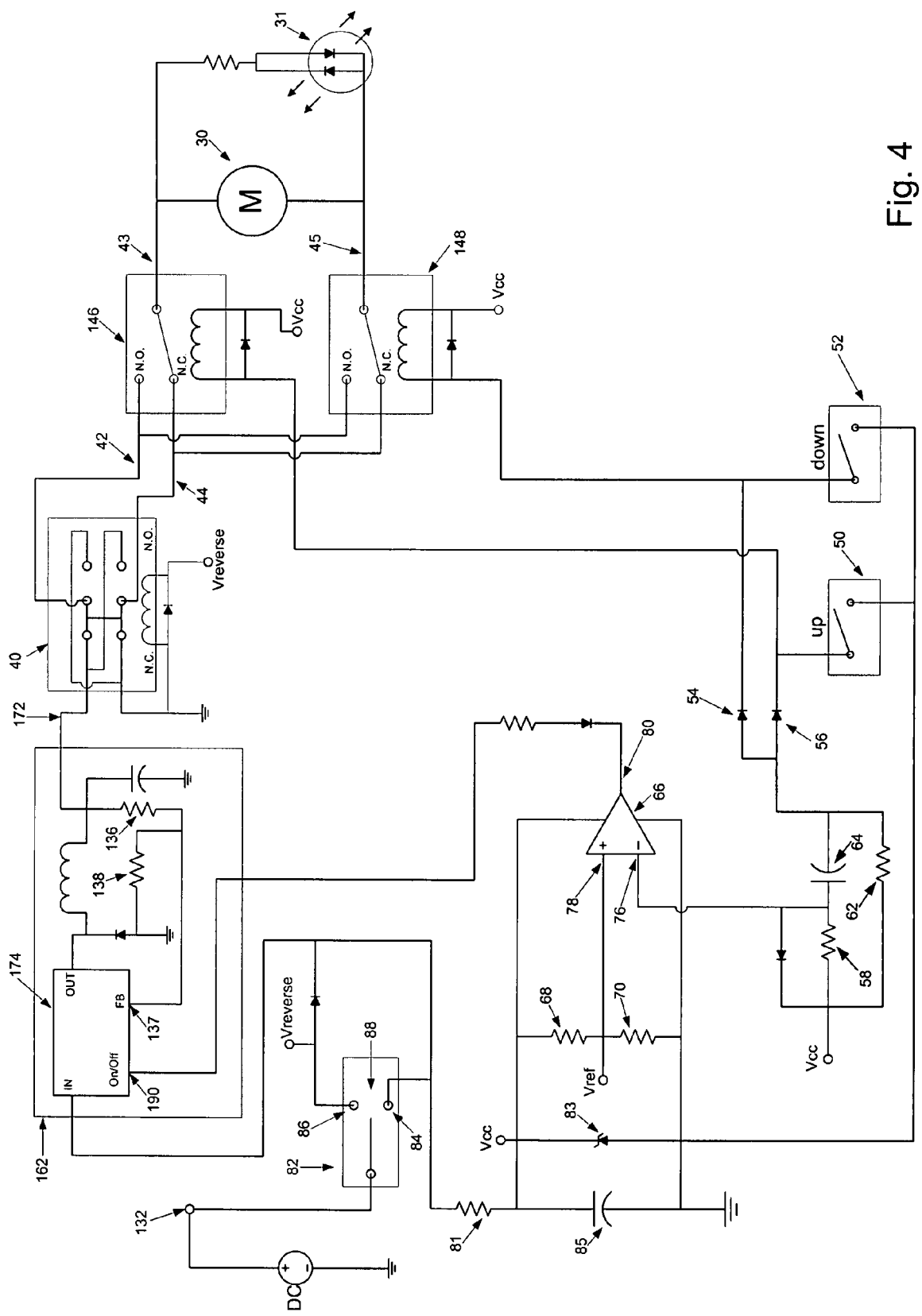
FIG. 4. is a circuit schematic of the system of the invention utilizing a switching regulator, a timer circuit, and electric relays.

In an alternate embodiment as shown by example in FIG. 4, the speed control module 162 may be implemented by a switching regulator 174. As an example, the switching regulator may be an LM2667 switching regulator integrated circuit (available from National Semiconductor Inc.) Such an exemplary switching regulator is shown configured as a buck converter in FIG. 4 and may be used to provide up to five amperes of DC output current in this example of the invention. In a standard configuration buck converter the input voltage provided to the input terminal 132 is adjusted to a regulated value on output terminal 172. The value of the output voltage on terminal 172 is selected by the respective values of resistor 136 and resistor 138 which provides a divided voltage to the feedback terminal 137 of the switching regulator 174. Additionally, the switching regulator 174 is provided with an ON/OFF terminal 190 which allows the converter to be turned off by an external signal. As implemented in this exemplary embodiment of the present invention, the timer circuit drives the ON/OFF line so as to provide the selected duration of output power which is made available to the electrically operated servo 30 via the output drive relays 146, 148. The use of a switching regulator 174, such as the LM2667, as shown in FIG. 4 allows the control system of the invention to operate more efficiently as compared to the version as shown in FIG. 3. This allows for less heat generation in a system for a given electrical load requirement and therefore a smaller and lighter control system. Both attributes are important in an aviation based application.

Figure 5:
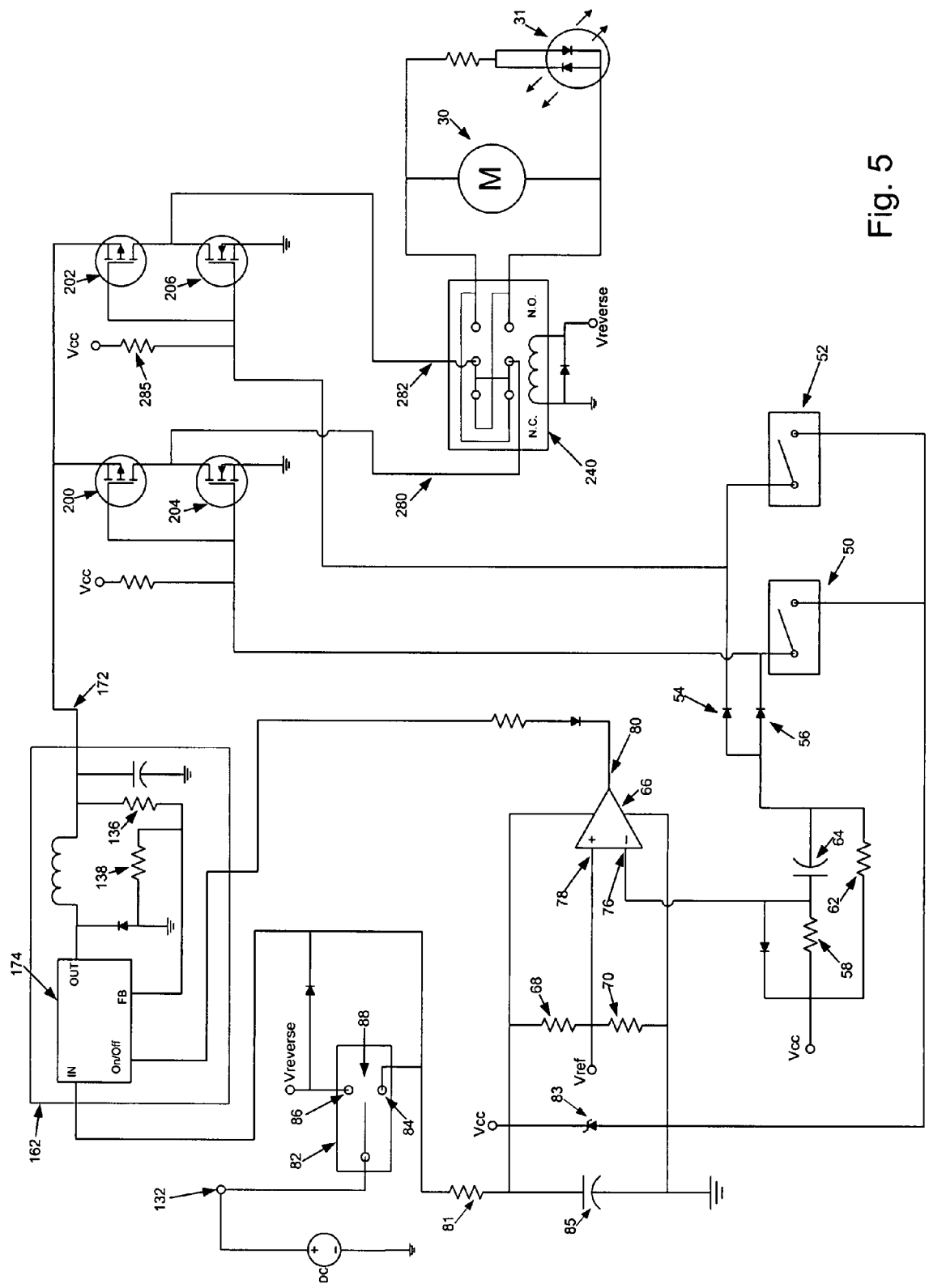
FIG. 5. is a circuit schematic of the system of the invention utilizing a switching regulator, a timer circuit, and a full bridge configuration of transistors.

In an alternate exemplary embodiment as shown in FIG. 5, the output drive relays or override relay may be implemented with transistors or other suitable semiconductor devices such MOSFETs. FIG. 5 shows an embodiment using a full bridge configuration of MOSFETs to implement the output drive module.

In FIG. 5, input power is received on input terminal 132, passed through the selector switch 82 and received by the speed control module 162. The adjustable and regulated output voltage from the speed control module 162, as provided by the switching regulator 174, is provided to the full bridge configuration of MOSFET transistors 200, 202, 204, 206 on output terminal 172. The common gate, common drain configuration of complementary transistors allows for polarity control of the voltage available on terminals 280 and 282.

When input switch 50 is activated, the gate terminal of transistors 200, 204 is pulled to a low state (ground potential). This turns N-channel transistor 204 off and turns the P-channel transistor 200 on. This causes the voltage on terminal 280 to rise to the voltage available on output terminal 172 of the speed control module 162. At the same time, input switch 52 is in the open state and the gate voltage on transistors 202 and 206 is pulled up to Vcc through resistor 285. This causes transistor 202 to be off and transistor 206 to be on. This in turn causes the voltage on terminal 282 to be low or be pulled to the ground potential. The voltage on terminals 280, 282 is then applied to the override/reversing relay 240. The voltage on terminals 280, 282 is then passed through override/reversing relay 240 and is made available to electric servo 30.

Alternately, if input switch 52 is activated and input switch 50 remains open, then transistors 202 and 204 becomes conductive and transistors 200 and 206 become non-conductive, thus allowing the voltage on terminal 282 to rise to the voltage on output terminal 172 and the voltage on 280 to go to the ground potential. When the override relay 240 is not energized, the normally closed contacts allow the polarity of voltage on terminals 280 and 282 be applied directly to the electric servo 30. This is the normal mode of operation as selected by the ON position 84 setting of the selector switch 82. In the Reverse mode of operation, as set by Reverse position 86 of the selector switch 82, override relay 240 is energized and the contacts of relay 240 move to the normally open position. This in turn causes the polarity of voltage applied to electric servo 30 to be reversed as compared to the normal mode of operation.

Figure 6:
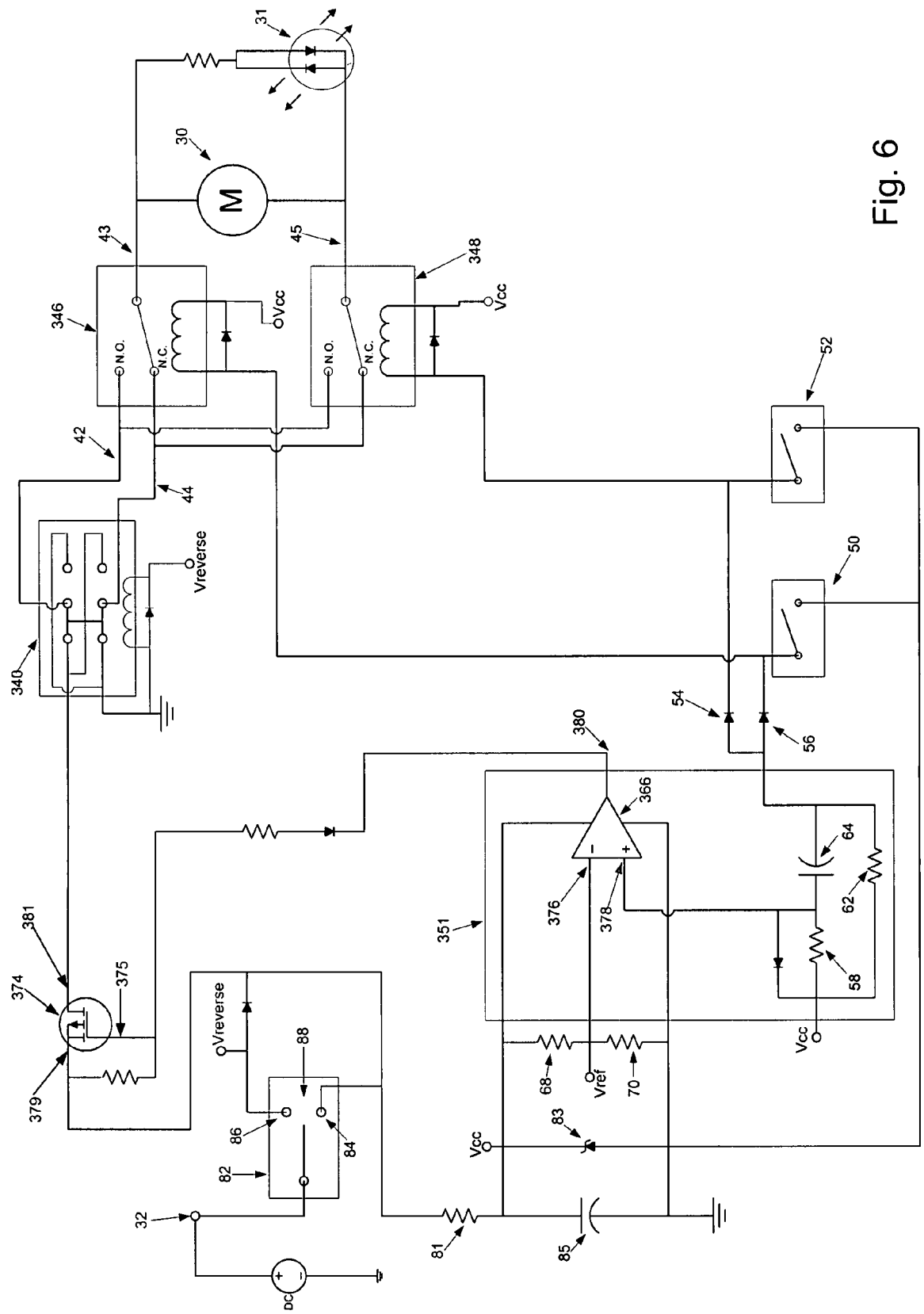
FIG. 6. is a circuit schematic of the system of the invention utilizing a series connected transistor, a timer circuit, and electric relays.

In an alternate exemplary embodiment, as shown in FIG. 6, the speed control function is not required and is replaced by a transistor 374 which is a controllably conductive device for selectively allowing input power to be applied to the output drive relays 346, 348 via override relay 340. Transistor 374 has a control terminal 375 and two main terminals, the source terminal 379 and the drain terminal 381. In this configuration, signals from the timer module 351 control the conductivity of transistor 374 by applying signals to the control terminal 375 in a manner similar to that of the embodiments wherein the speed control module was enabled to be active or inactive by signals from a timer module.

As in previous examples, input switches 50 and 52 operate respective output drive relays 346, 348 as well as allow for the charging of capacitor 64 through resistor 58 as supplied by the Vcc terminal. Comparator 366 receives the voltage on capacitor 64 on its non-inverting input pin 378 and receives the Vref voltage on its inverting input pin 376. When the voltage on capacitor 64 is less than the Vref voltage then the output pin 380 of comparator 366 is in a low state. This low state causes the control terminal 375 of transistor 374 to be at a lower potential than the source terminal 379 thereby causing the P-channel Mosfet embodiment of the transistor 374 to be conductive. This in turn allows the voltage at the input terminal 32 to be passed through the selector switch 82 through to the override/reversing relay 340 followed by the output drive relays 346 and 348 and ultimately to the electric servo 30.

When the capacitor 64 voltage exceeds the Vref voltage, then the output pin 380 of the comparator 366 goes to a high state and consequently transistor 374 becomes non-conductive. This in turn removes power from electric servo 30 and ends the servo movement regardless of the state of input switches 50 and 52.

Alternately, the timing function and reversing function may be accomplished with a suitably programmed microcontroller programmed with software code to implement the functions as previously described, it is within the skill of one in the art to implement software code to carry out the described timing functions, receipt of input signals and provide output signals to control the respective controllably conductive devices according the functional descriptions provided. Therefore no specific software code is incorporated with these examples of the present invention.

The present invention has been described using a number of embodiments with accompanying figures, these are provided as examples and are not intended to be limiting. One of skill in the art will appreciate that variations and combinations of the claimed invention are possible and only limited by the following claims.

I claim:

1. A vehicular electrical control system for controlling an electrically operated servo comprising:
a controllably conductive device, wherein the controllably conductive device selectively applies power to the electrically operated servo;
an input signal receiving circuit in communication with the controllably conductive device, wherein the input signal receiving circuit receives an input signal from an input switch to select a motion of a moveable control surface operated by the electrically operated servo; and wherein the input signal receiving circuit causes the controllably conductive device to be conductive in response to the input signal; and
a timer circuit in communication with the input signal receiving circuit and the controllably conductive device, wherein the timer circuit responds to the input signal from the input switch causing the controllably conductive device to be non-conductive if the input signal is present for greater than a selectable time period, and wherein the timer circuit is resettable in response to the input signal from the input switch.

2. The control system of claim 1, further comprising a direction control circuit, wherein the controllably conductive device is part of the direction control circuit, and wherein the direction control circuit selectively drives the electrically operated servo in a first normal direction and in a second reverse direction.

3. The control system of claim 2, wherein the direction control circuit comprises a relay with at least a single pole double throw contact set.

4. The control system of claim 2, wherein the direction control circuit comprises a full bridge configuration of transistors.

5. The control system of claim 4, wherein the full bridge configuration of transistors are configured in a common gate arrangement.

6. The control system of claim 1, further comprising a speed control circuit in communication with the controllably conductive device, wherein the speed control circuit selectably controls the speed at which the electrically operated servo causes the moveable control surface to move.

7. The control system of claim 1, wherein the selectable time period of the timer circuit limits the conduction of the controllably conductive device, whereby the motion of the movable control surface is limited to less than a full deflection motion in response to a single occurrence of the input signal.

8. The control system of claim 2, further comprising a selector switch in communication with the direction control circuit, wherein the selector switch includes positions corresponding to at least a first normal direction, a second reverse direction and no motion of the electrically operated servo.

9. The control system of claim 6, further comprising a direction control circuit, wherein the direction control circuit is coupled in series connection with an output of the speed control circuit, and wherein the speed control circuit and the direction control circuit are coupled to the timer circuit, and wherein a conductive failure of either the direction control circuit or the speed control circuit allows for a time limited operation of the electrically operated servo.

10. The control system of claim 1, further comprising an indicator for alerting an operator as to a failure condition associated with an un-commanded operation of the electrically operated servo.

11. A vehicular control system for operating an electrically activated actuator from a source of power comprising:
 a controllably conductive device having a control terminal, and at least two main terminals;
 a direction control circuit in series connection with one of the main terminals of the controllably conductive device, wherein the direction control circuit control power delivered to the electrically activated actuator, and wherein the controllably conductive device selectively supplies power to the direction control circuit; and
 a reset-able timer circuit having a selectable time period, an input for receiving signals to initiate the counting and resetting of the selectable time period and an output for providing a signal that corresponds to the duration of the selectable time period, wherein the output is coupled to the control terminal of the controllably conductive device, thereby limiting the controllably conductive device to be conductive for the selectable time period.

12. The system of claim 11, wherein the controllably conductive device is adapted to selectably control the speed of activation of the actuator.

13. The system of claim 11, wherein the direction control circuit comprises a multi-throw relay, and wherein the multi-throw relay determines the polarity of voltage applied to the electrically activated actuator.

14. The system of claim 11, wherein the direction control circuit comprises a full bridge configuration of transistors, and wherein the full bridge configuration of transistors selects the direction of operation of the electrically activated actuator.

15. The system of claim 11, wherein the reset-able timer receives signals on its input from a manually actuated switch.

16. The system of claim 11, wherein the reset-able timer receives signal on its input from an automated electronic device.

17. The system of claim 11, wherein the controllably conductive device becomes non-conductive at the end of the selectable time period.

18. The system of claim 11, wherein the reset-able timer comprises a micro-controller.

\* \* \* \* \*